US006763603B2

(12) United States Patent
Carrabino

(10) Patent No.: US 6,763,603 B2
(45) Date of Patent: Jul. 20, 2004

(54) TAPE SCRIBER

(76) Inventor: John Carrabino, 13251 Montwood La., Kirkwood, MO (US) 63122

( * ) Notice: Subject to any disclaimer, the term of this patent is extended or adjusted under 35 U.S.C. 154(b) by 0 days.

(21) Appl. No.: 10/386,186

(22) Filed: Mar. 11, 2003

(65) Prior Publication Data

US 2003/0172540 A1 Sep. 18, 2003

Related U.S. Application Data

(60) Provisional application No. 60/363,320, filed on Mar. 12, 2002.

(51) Int. Cl.$^7$ .............................................. G01B 10/00
(52) U.S. Cl. .......................................... 33/770; 33/668
(58) Field of Search ............................ 33/770, 42, 755, 33/759, 668

(56) References Cited

U.S. PATENT DOCUMENTS

| 2,349,670 | A | * | 5/1944 | Moxey ..................... 33/27.03 |
| 3,192,630 | A | * | 7/1965 | Dineson ...................... 33/42 |
| 3,509,631 | A | * | 5/1970 | Shimoyama ............... 33/27.01 |
| 5,542,184 | A | * | 8/1996 | Beard .......................... 33/668 |
| 5,671,543 | A | * | 9/1997 | Sears .......................... 33/668 |
| 5,782,007 | A | * | 7/1998 | Harris ......................... 33/768 |

* cited by examiner

Primary Examiner—Christopher W. Fulton
(74) Attorney, Agent, or Firm—Paul M. Denk

(57) ABSTRACT

A tape scriber, formed as an integral device, either molded or cast, includes a base portion, having a cavity formed therein, for accommodating the tab end of the tape. The base portion includes a laterally extending stem, having a slot there through, and into which a box cutter may locate its razor tip, in preparation for cutting of a board during usage. A rearwardly extending member includes an inclined slot, or at least a slot which accommodates a pencil upon an incline with the tip of the pencil extending through a bottom aperture, aligning under the precise end of the tape, to furnish a scribe or pencil mark at that location, as the rule is moved, to the exact dimension measured on its tape during usage.

7 Claims, 2 Drawing Sheets

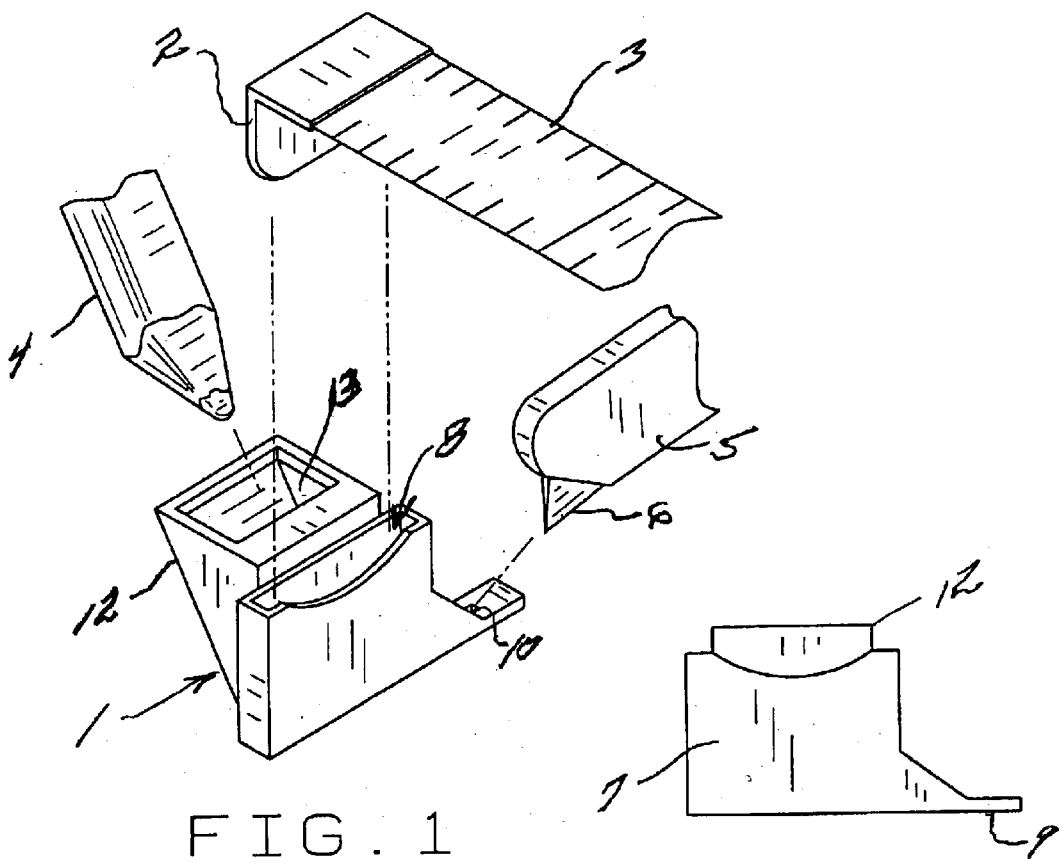
FIG. 1
FIG. 2
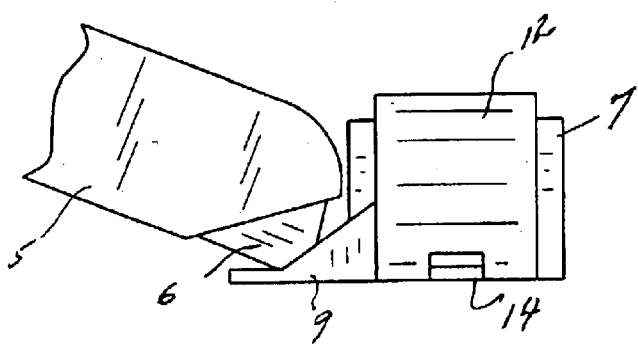
FIG. 3

TAPE SCRIBER

This application claims benefit of Provisional application Ser. No. 60/363,320 filed Mar. 12, 2002.

BACKGROUND OF THE INVENTION

This invention relates generally to a device for attachment to the end of a tape, such as the manual or automatic rewindable type of tape as used by the carpenter, contractor, plasterer, or the like, and more specifically pertains to a holding device that connects to the end of the tape and accurately aligns both a scribing pencis or cutting blade with the exact end of the tape, so that the user can make measurements with a high degree of precision without having to recalculate deminsions, since the scriber or cutter is at the exact end of the measuring tape during its usage.

A variety of scribing devices are available in the prior art. For example, when the plasterer is measuring dry wall to make a precision cut, in order to fit the cut piece of plaster board into a precise location, while dry walling a facility, under normal conditions he must use a ruler or tape to scribe a line upon the dry wall, initially, then must use a razor to make a cut, hopefully in alignment with the drawn pencil line, in order to cut the board with some degree of precision. Thus, the potential for inaccuracy is always present because of the multiple measurements, scribing, and then cutting that is required in separate procedures in order to end up with a cut sheet for application to the wall.

Various types of mechanisms have been made available in the prior art, for example, the U.S. Pat. No. 4,103,426, to Robin, shows an apparatus for converting a measuring tape to a compass as noted. This device includes a carriage which interlocks with the holder at the end of the tape, and presents a bore, outwardly thereof, for use for holding an application of a scribing device that may insert to provide means for drawing or scribing a circle as upon a surface. Obviously, the fact that the scriber is held at a position remote from the end of the tape, requires a mathematical calculation or addition when measuring the true accuracy of the length dimension being scribed.

The patent to Hines, U.S. Pat. No. 4,976,037, shows another marking and cutting device. It also shows a means for holding either a pencil or knife blade at the end of the tape, in order to provide the alternative of either scribing or cutting of a surface. But, the pencil or knife held within the container, is offset from end of the tape, and therefore requires some additional calculation for determining the exact dimension being scribed, upon the surface in the first instance.

The patent to Waldherr, U.S. Pat. No. 5,172,486, shows a fixture for tape measure. This device also clips onto the end of the tape, or the tape slides into the retaining member. Then, the device includes a slot, wherein a nail, or perhaps a pencil, or other instrument, may insert, to provide for measuring and scribing. This device is of a different type of structure from the invention as described herein.

The patent to Coffey, U.S. Pat. No. 5,289,637, shows a utility knife. This device is just that, a utility knife, where a measuring tape, or more specifically, its hooked end, may engage within the body member slot, to provide a rough measurement for cutting for usage of the utility knife as shown.

The patent to Dawson, U.S. Pat. No. 5,379,524, shows a versatile tape measure tool. This device can also be used for holding a pencil or a specially designed knife blade within a tool holder, as noted at the end of the shown scale. This device may hold a measuring tool at the end of the tape, and includes a variety of other structures for furnishing other results but it is uncertain if it provides for exact measurement at the end of the tape when scribing or cutting a specific surface.

The patent to Graham, U.S. Pat. No. 5,406,711, shows a fixture for enabling marking and cutting of a straight line. This simply shows a loop within a knife and into which the end of the tape may connect, during usage and application.

The patent to Beard, U.S. Pat. No. 5,542,184, shows a tape measure knife attachment for cutting drywall. This attachment, which may be used for cutting as by way of a knife blade, also cooperates and fits on to the end of the tape tab as noted.

The patent to Harris, U.S. Pat. No. 5,782,007, shows a tool guiding tape measure. This device is quite complex in structure and does not appear to provide means for exact measurement, as through both scribing and cutting, after this tool guiding means is attached to a tape measure, as during usage.

The patent to Garity, U.S. Pat. No. 6,070,338, shows a device for measuring and cutting sheetrock. This device appears to be attached permanently to the end of the tape and can be used for aligning a cutter for cutting sheetrock, during usage.

BRIEF SUMMARY OF THE INVENTION

The current invention contemplates the formation of a small plastic or other hard material clip, that connects to the end lip of a scale or rule, whether it be of the wind up type, or otherwise, and can be used for two purposes, once set. One, a cavity at the front of the device has an opening therein, and which opens to the bottom of the device, at an angle, leading to the precise end of the scale, for the scribing tip of a pencil, or the like, during usage. This can be used for scribing at the precise leading edge of the scale, and leave a pencil mark, as for use upon wallboard, drywall, board, or the like, that needs to be marked and cut. Secondly, the device also includes a slight integral stem that extends to the side, has a slot provided through it, and into which a razor edge can be arranged there through, to provide for a precise cutting, for example, also of drywall or wall board, at the precise measurement measured upon the tape to furnish a cutting of such board incident to its attachment to a wall during its fabrication and construction.

This invention is integrally molded, from a single hard plastic, or it may be cast, so as to furnish a single device, which may be readily carried within the pocket or elsewhere, by the carpenter, plasterer, or contractor, quickly attached to the end of the tape into a integral lateral slot at the back end of the device to hold the tape end fixed in place, so that when the tape is then measured from the side of the board to where it needs to be scribed or cut, a pencil may be applied therein, oriented downwardly so that its tup will scribe directly beneath the exact end of the tape, or a cutter may be inserted into its lateral slot, to allow for cutting of the top surface of the dry wall, incident to its breakage and severing to an exact dimension as required for the scribed board.

Thus, this tape scriber may be used in conjunction with one of the wind up rules of the type that is pulled out to make measurements during fabrication in performance of a building project. The invention is the small plastic clip, as foresaid, that hooks onto the end lip of the scale or rule. The clip is multi-shaped, but integrally formed, and can be molded of plastic or cast of metal, into its readily usable shape. It has a slotted cavity at the front end of the device, which inclines downwardly, and inwardly, with an opening provided at its bottom, so that when any pencil is located therein, its writing tip will extend substantially and exactly below the leading edge of the scale to provide for a pencil mark at that exact location or line as the pencil scribes a mark upon the wall board during usage. In addition, a lateral step extends from the side of the device and has a small longitudinal slip provided therein, and into which a blade, such that of a box cutter or other razor like device, may insert, and can immediately scribe a mark, once again, as the scale and the device move along the length of the drywall being measured and cut. Furthermore, as explained in its integral construction, at the back end of the cavitied portion of the device, there is a length of slip that extends downwardly and is sized so as to accommodate the tab at the front of these types of rules, and which holds the scribing device at a precise location at the end of the tape, so that when either the pencil, or the knife, is applied, the scribing or cutting edges will be perfectly aligned with that tab, which depicts the exact end of the tape so that a precise measurement can be made, obviating the need to make further calculations, such as must be done with prior art inventions that offset the scribe or cutting mark upon the board because of their configuration.

It is, therefore, the principle object of this invention to provide a scribing device tha fits exactly onto the end of a roll up or other tape measure and readily accommodates the insertion of a pencil or the tip of a razor cutter, exactly in line with the end of the tape, so that a scribed mark or cutting line may be achieved, from the direct measurement made from the side of the board to which the rule is applied.

Still another object of this invention is to provide for a scribing device where its various cavities are properly oriented at specific angular relationships, so as to provide for a ready and precise measurement, rather than requiring the user to recalculate measurements to compensate for the offsetting of the pencil, or cutter, during usage, as required by the prior art.

Still another object of this invention is to provide for an integrally structured and once piece scriber that is readied for usage without further manipulation or attachment to the end of a rule during usage.

These and other objects may become more apparent to those skilled in the art upon reviwing the subject matter of the invention as provided herein, and upon undertaking a study of the description of its preferred embodiment in view of the drawings.

BRIEF DESCRIPTION OF THE DRAWINGS

In referring to the drawings, FIG. 1 provides an isometric and explorative of the tape scriber of this invention, showing the device, where the tab end of the rule inserts, when connected, and how a pencil or razor edge may be applied in conjunction or with, for use for scribing or cutting of drywall, or the like.

FIG. 2 provides a front view thereof;

FIG. 3 is a back view thereof;

DESCRIPTION OF THE PREFERRED EMBODIMENTS

Figure 4:
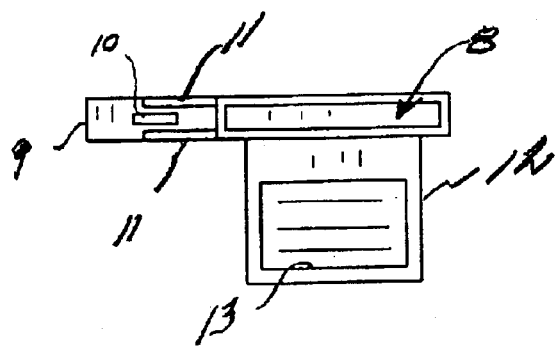
FIG. 4 is a top plan view.
Figure 5:
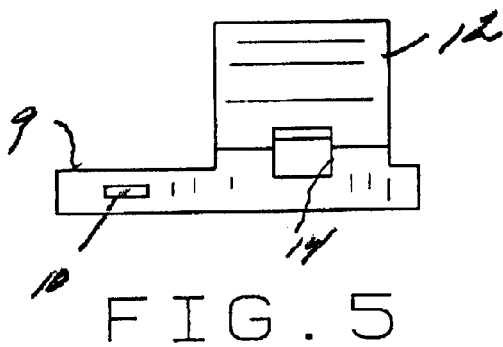
FIG. 5 is a bottom view.

In referring to the drawings, and in particular FIG. 1, therein is showing the tape scriber (1) of this invention. It is the type of integrated device that can accommodate the insertion of the tab end (2) of a tape measure (3) in order to fix the scriber in conjunction with the end of the tape during a measurement, and likewise, can accommodate the insertion of a pencil, as at (4) or a box cutter (5) or more specifically its razor tip, 6, so that both a marking or a cutting can be achieved through usage of this device, when quickly applied to the end of the tape, and then shifted, during measurements in preparation for cutting of drywall, etc.

As can be seen, also in FIG. 2, the front of the scriber includes a solid flat portion, (7) and into which there is provided a slot (8) and into which the tab portion (2) of the rule may snuggly insert when affixing the tape scriber to the scale in preparation for usage. Extending laterally of the side, but integrally, of the flat portion (7) is a stem (9) which provides a small slot (10) therein, and into which the tip of a razor or box cutter (5) may insert, when it is desired to measure and cut, for example, plaster board, to precise measurements when being readied for installation. As can be seen also in FIG. 3, holding the boxer cutter (5) at an angular relationship allows for its tip to insert in and through the slot (10) to furnish a sufficient depth to allow the cutter to impale within the surface of the drywall, to provide for its cutting in preparation for breaking of the drywall along the line ascribed, as is well known. The device is molded in a manner that provides for further reinforcement, as at (11) to add to the structural strength of the tape scriber at this location.

Figure 7:
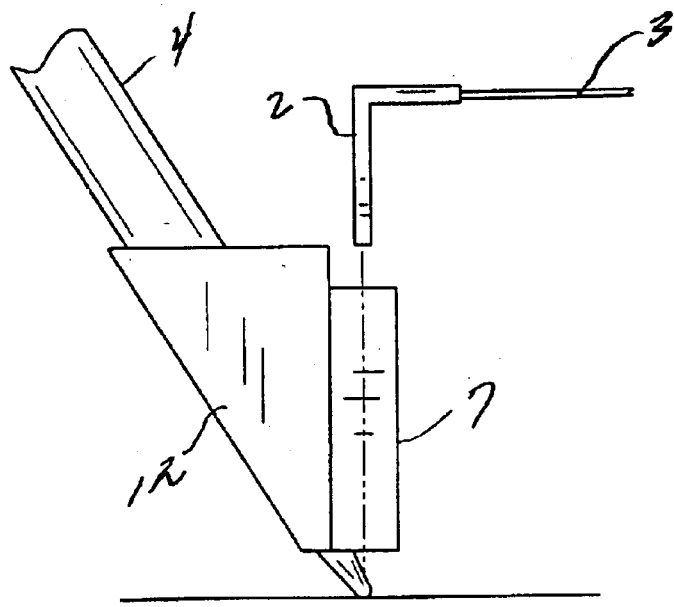
FIG. 7 is a left side view, showing how a pencil is directly aligned under the edge of the tape, when inserted during usage.

As can be seen in FIG. 4, from the back end of the device is provided a substantially angulated member (12) and which includes an inclined cavity (13) there through. The bottom of the cavity opens as at (14) out the bottom of the device, as can be noted, and it is through this cavity, on an incline, that a pencil inserts, and its tip, as can be noted in FIG. 1, projects through the bottom cavity (14) to not only align the tip of the pencil with exact bottom edge of the tape (3), but like wise provides a line ascribed exactly at that location as can be seen in FIG. 7. Thus, this obviates the need and the problem associated with many of the other scribing devices, where the pencil may be located vertically, and provide a line ascribed at maybe a quarter inch off from the tip of the scale, and therefore requires the user to make a calculation to compensate for that difference, when making a measurement upon the drywall, in preparation for its cutting.

Figure 6:
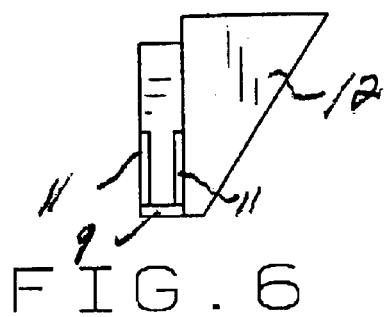
FIG. 6 is a right side view.

As can also be seen in FIG. 6, in addition to FIG. 4, the slot (10) through which the razor (6) locates is furthermore directly in line with the center of the slot (8) and therefore, any cut being made is at the exact dimension as measured upon the tape, from the edge of the board, and does not require any further addition or subtraction from the measured dimension, to compensate for any offsetting that may occur with prior art devices.

As can be noted, especially from FIG. 1, this tape scriber is of an integral type device, molded as a one piece unit, as all of the facilities available upon it for cooperating with the tape (3) and more particularly, its tabbed end (2) to hold the tape in place, and it is preferable that the tab (2) will comprise a pressure fit into the slot (8) so that the device will hold in place upon the tape, even when not being held there by the user. Then, the rule, at its opposite end, will be held in position along the edge or measuring side of the drywall or other board, and a pencil or cutter can be inserted into the respective cavities (13) or (10) to provide for either scribing or cutting of the surface of the drywall, during its preparation for application and usage.

Variations or modifications to the subject matter may occur to this skilled in the art upon reviewing the summary of the invention as provided herein, and upon undertaking a study of the description of the preferred embodiment. Such variations, if within the spirit of this development, are intended to be encompassed within the scope of the invention as described herein. The description of the preferred embodiment, and the depiction of this invention in the drawings, are set forth for illustrative purposes only.

What is claimed is:

1. A tape scriber and alignment device for use for scribing or cutting of drywall, box board, and the like, said device including a solid portion having a slot therein, said slot designed for providing accommodation of the tab end of a tape measure for use for measuring distances for scribing and cutting of said drywall and board, a stem portion extending laterally from said slotted portion, inline with the tab end of a tape measure, said stem portion having a slot therethrough, and provided for accommodating the insertion of a cutter razor tip there through for cutting upon any measured drywall and box board, a substantially angulated member extending integrally from the backend of the solid portion, said angulated member having an inclined cavity provided there through, and provided for accommodating a pencil therein for marking of the wall or board at the precise measurement by the tape measure during its adjustment, the inclined cavity of the angulated member angulating the pencil to provide for a scribe point aligned directly under the tab end of the tape measure during a measurement so that as the tape and scribing device are moved, a pencil mark is made upon the drywall and board to furnish a scribe line for further processing, whereby said tape scriber may be used for both scribing and cutting of drywall or box board during usage and application.

2. The tape scriber device of claim 1 wherein said slot within the stem is elongated to accommodate the insertion a box cutter or razor tip therein sufficiently to allow for some depth of penetrated cutting within the drywall and box board during its usage.

3. The tape scriber device of claim 1 wherein said inclined cavity of the angulated member having sufficient size to closely accommodate the insertion of a pencil therethrough, to provide for the lower pencil tip to enter into alignment under the tab end of the tape measure to assure a precise scribed line measurement during usage of this scriber device.

4. The tape scriber device of claim 3, wherein the lower end of the inclined cavity opens partially through the bottom of the solid portion and the lower edge of the angulated member to assure precise location of the pencil tip under the tab end of the tape measure while scribing of dry wall and box board.

5. The tape scriber device of claim 1, wherein said device is integrally formed as a one piece item through molding.

6. The tape scriber device of claim 5, wherein the device is integrally molded of a polymer.

7. The tape scriber device of claim 1, wherein the slot of the stem and the bottom of the inclined cavity of the angulated member are in lateral alignment.

* * * * *